United States Patent [19]

Roussel et al.

[11] Patent Number: 4,853,136
[45] Date of Patent: Aug. 1, 1989

[54] PROCESS FOR OXIDIZING SUBSTANCES DISSOLVED OR IN SUSPENSION IN AN AQUEOUS SOLUTION

[75] Inventors: Jacques Roussel, Hauterives; Xavier Cochet, Trets, both of France

[73] Assignee: L'Air Liquide, Paris, France

[21] Appl. No.: 147,056

[22] Filed: Jan. 22, 1988

Related U.S. Application Data

[63] Continuation of Ser. No. 824,063, Jan. 30, 1986, abandoned.

[30] Foreign Application Priority Data

Feb. 4, 1985 [FR] France ................. 85 01488

[51] Int. Cl.$^4$ .............................................. C02F 1/72
[52] U.S. Cl. ..................... 210/761; 210/766; 210/904; 210/909; 423/514
[58] Field of Search ............... 210/758, 761, 762, 766, 210/904, 909; 423/514

[56] References Cited

U.S. PATENT DOCUMENTS

| | | | |
|---|---|---|---|
| 3,507,788 | 4/1970 | Cole et al. ........................ | 210/761 |
| 3,607,735 | 9/1971 | Hover ............................... | 210/170 |
| 3,696,929 | 10/1972 | Shah .................................. | 210/199 |
| 4,058,433 | 11/1977 | Fuller et al. ..................... | 210/758 |
| 4,294,720 | 10/1981 | Visser et al. .................... | 210/761 |
| 4,312,761 | 1/1982 | Gitchel ............................ | 210/761 |
| 4,347,144 | 8/1982 | Bodenbenner et al. ......... | 210/761 |
| 4,744,909 | 5/1988 | Ferraro et al. .................. | 210/761 |

OTHER PUBLICATIONS

Wilhelmi et al., "Wet Air Oxidation-An Alternative to Incineration", CEP, Aug. 1979, pp. 46-52.
Anderson et al., "Gas Phase Controlled Mass Transfer in Two Phase Annular Horizontal Flow", AICHEJ, Sep. 1964, pp. 640-645.

Primary Examiner—Peter Hruskoci
Attorney, Agent, or Firm—Lee C. Robinson, Jr.

[57] ABSTRACT

The process comprises injecting into the inlet of a polyphase tubular reactor (6), on one hand, the aqueous solution at such temperature that the oxidation reaction occurs at a temperature between 50° C. and 370° C. and at an absolute pressure Pe of between 2 bars and 210 bars, and, on the other hand, gaseous oxygen at a pressure slightly higher than said pressure Pe. The invention is applicable to the treatment of effluents for the chemical destruction of pollutants.

6 Claims, 2 Drawing Sheets

PROCESS FOR OXIDIZING SUBSTANCES DISSOLVED OR IN SUSPENSION IN AN AQUEOUS SOLUTION

This application is a continuation of application Ser. No. 824,063, filed Jan. 30, 1986, now abandoned.

The present invention relates to a process for oxidizing substances dissolved or in suspension in an aqueous solution, in which process there are injected into a polyphase tubular reactor, on one hand, said solution at such temperature that the oxidation reaction occurs at a temperature higher than 50° C. and at an absolute pressure higher than 2 bars, and, on the other hand, gaseous oxygen at a pressure slightly higher than said liquid pressure, and there is received at the outlet of said tubular reactor the solution in which said substances are oxidized.

The invention more particularly relates to the wet oxidation, i.e. the oxidation of substances which are dissolved or in suspension in an aqueous solution such as, for example, sulphides, thiosulphates, sulphites, phenols, cyanides, pesticides, etc.

Among the wet oxidation processes employed up to the present time, there may be mentioned the process termed "Zimpro Process" described in the article by A. R. WILHEIM and P. V. KNOPP entitled "Wet air oxidation" which appeared in the review CEP of August 1979. This process comprises achieving the oxidation of products contained in the starting solution in air, in an autoclave, at a temperature between 180° and 310° C., the total pressure being between 15 and 200 bars. This process has the drawback of being extremely costly. Another process for the oxidation of industrial effluents containing sulphides and also for the oxidation of sulphites, is described in French patent No. 78 16,186. This process comprises oxidizing the starting solution with pure oxygen in a bubble column operating under moderate pressure (1 to 10 bars) and at low temperature (20° C. to 80° C.). But this process has the drawback of not permitting the oxidation of substances which are much more stable than sulphides or sulphites, such as for example halogenated organic products.

Another of the wet oxidation processes employed up to the present time is the process termed "Modar Process" described for example in British patent No. 2,075,484. According to this process, there are oxidized organic products which are dissolved or in suspension in an aqueous solution brought to a temperature higher than the critical temperature of water (374.2° C.) by means of oxygen at a pressure higher than its critical pressure (218.3 bars). This process permits the obtainment of a complete oxidation in a rapid manner. On the other hand, it has the drawback of requiring complex technology, owing to the high pressures and high temperatures at which it is carried out, and is consequently very costly.

There has also been described in U.S. Pat. No. 3,696,929 a tubular reactor comprising a plurality of sections connected by curved parts with injectors of air or oxygen arranged ranged along each section at a pressure between 2 and 20 bars and a temperature of 50° C. to 150° C.

There has also been described in the A.I.Ch.E. Journal, vol. 10, No. 5, September 1964, New York (U.S.) by J. P. Anderson et al. in an article entitled "Gas phase controlled mass transfer in two phases annular horizontal flow", pages 640-845, the principle of such reactions.

It is known from U.S. Pat. No. 3,607,735 a process for treating waste water with bacteria the growth of which is facilitated by the introduction of oxygen. For this purpose, there is introduced at the inlet of a reactor a mixture of waste water, mud containing the bacteria and oxygen. In the course of the passage through the reactor, the bacteria act on the waste water so as to treat it while the oxygen permits the development and the growth of new bacteria which will thereafter be used after decantation of the mud in a decantation tank placed at the outlet of the reactor. This process concerns only biodegradable products and requires rather complicated equipment for recycling the bacteria in the reactor.

The present problem for one skilled in the art is to find a process which is both rapid and economical. Now, these two requirements are contradictory for this process. Indeed, if it is desired to rapidly oxidize a solution in a polyphase reactor, the simplest procedure is to effect a plurality of injections of gaseous oxygen under high pressure throughout the path of the solution. This manner of proceeding is very costly since the reactor is complicated as it has many gaseous oxygen pipes, which complicates the distribution of the oxygen. Further, the injection of gaseous oxygen under high pressure requires a compressor, an apparatus which is both expensive and consumes energy.

At first sight, it could be thought that an economical process would include mixing the oxygen and the solution in the reactor at a pressure on the order of atmospheric pressure. Unfortunately, it is found in this case that, on one hand, very great lengths of reactors are required, and, on the other hand, the rate of utilization of the injected oxygen is very low (well below 90%) if it is desired to reach an oxidation rate on the order of 90%. Consequently, even a process in which the oxidation is carried out slowly, is not economical, bearing in mind the price of the oxygen and of the piping constituting the reactor, particularly when the products are corrosive. The process according to the invention provides a solution to this problem: it concerns a process for oxidizing substances which are dissolved or in suspension in an aqueous solution which is both simple, rapid and economical, under good conditions of safety (no risks of explosion) and employing simple and inexpensive equipment.

The process according to the invention comprises effecting a single injection at the inlet of the reactor of a mixture of said solution and gaseous oxygen, at a pressure which may be as much as 210 bars and at a temperature which may be as much as 370° C. The injection of the solution is effected at a surface velocity in an empty pipe of between 1 m/s and 10 m/s, and the injection of the oxygen is effected at a surface velocity in an empty pipe of between 0.01 m/s and 5 m/s. The specific energy due to pressure drops consumed per unit volume of the reactor is between 0.4 KW/m$^3$ and 40 KW/m$^3$. The rate of oxidation of the dissolved substances is higher than or equal to 90% while the rate of utilization of the oxygen in the course of the oxidation reaction is higher than or equal to 90%.

Surface velocity in an empty pipe of a fluid introduced in a conduit is intended to mean the mean velocity that the fluid would assume in said conduit bearing in mind its mass flow and its specific mass, assuming that the conduit is "empty" (no components and no other fluids therein).

The fact that the wet oxidation reaction is carried out in accordance with the invention in a polyphase tubular reactor permits the obtainment of a good dispersion of the oxygen in the solution. By choosing a rather high operating pressure, which is however lower than the critical pressure (no higher than 210 bars), a high oxygen dissolving rate in the solution can be achieved. Further, by choosing an operating temperature which is such that the oxidation reaction occurs at a temperature higher than 50° C., but however lower than the critical temperature (no higher than 370° C.), a high reaction velocity is obtained. Moreover, the choice of the surface velocities in an empty pipe of the injection of the solution and oxygen has been found by experience to be decisive for the economy of the process. All these combined characteristics according to the invention permit obtaining an almost total oxidation of the products contained in the solution within a rather short lapse of time, and in any case higher than or equal to 90% for a rate of utilization of the oxygen higher than or equal to 90%. Further, the process according to the invention has the advantage that, in the polyphase tubular reactor employed, there is no risk of inflammation or explosion owing to the considerable dispersion of the oxygen in the solution.

The features and advantages of the invention will be better understood from the following description of two manners of carrying out the following process. These are given as non-limiting examples with reference to the accompanying drawings.

BRIEF DESCRIPTION OF THE DRAWINGS

The drawings show diagrammatically, in FIG. 1, a plant for carrying out the process according to the invention and, in FIG. 2, a detail of this plant.

EXAMPLE 1

Figure 1:
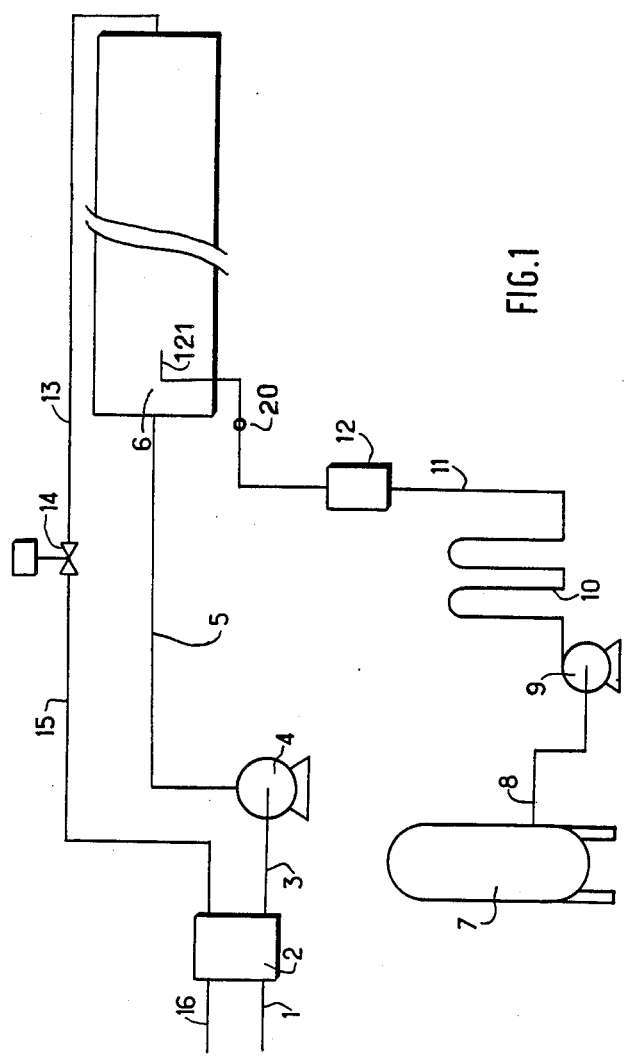

It is desired to oxidize the sulphides contained in a brine having the following composition:
sodium sulphate: 400 g/l
sodium sulphide: 6 g/l
soda 5 g/l
polysulphides 1 g/l The rate of flow of the brine to be treated is 30 m$^3$ per hour and its starting temperature is 60° C.

The brine to be treated coming from the conduit 1 is made to pass into a heat exchanger 2 which it leaves through the conduit 3 at a temperature of 85° C.; it is then sent by a pump 4, at an absolute pressure of 40 bars, through a conduit 5 to the inlet of a polyphase tubular reactor 6. This reactor 6 is of known type, such as for example that described in the article in the A.I.Ch.E. Journal of Sept. 1964 entitled "Gas Phase Controlled Mass Transfer in Two Phase Annular Horizontal Flow" by J. P. ANDERSON, R. E. BOLLINGER and D. E. LAMB.

Figure 2:
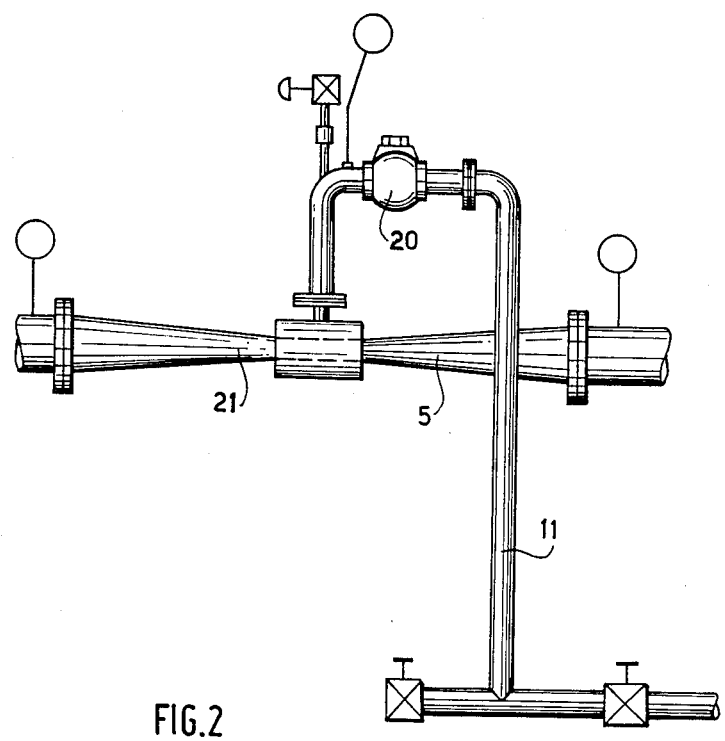

At the same time, liquid oxygen contained in a cryogenic storage device 7 is drawn off through a conduit 8 and compressed in the liquid state by a cryogenic pump 9 until it has reached a pressure slightly higher than the pressure of the solution so as to overcome the pressure drops. The liquid oxygen compressed in this way is then caused to pass into a heater 10 which it leaves in the gaseous state at a temperature in the neighbourhood of or higher than room temperature. It is then sent through the conduit 11, provided with an oxygen flow measuring and regulating device 12, to the inlet of the tubular reactor 6 through a check-valve 20 in a Venturi 21 (FIG. 2) or in a jet 121 placed at the center of the reactor 6 at the inlet of the latter (FIG. 1).

Bearing in mind the rate of flow (30 m$^3$ per hour) of the liquid to be treated, there is used a tubular reactor 6 which has a diameter of 0.05 m and a length of 200 m. The "empty pipe" oxygen velocity is 0.292 m/s while the velocity of injection in an empty pipe of the solution is 4.24 m/s. The specific consumption of energy is on the order of 11.3 KW per cubic metre of the reactor. The rate of flow of gaseous oxygen in the reactor 6 is 90 kg/h.

There is recovered at the outlet of the reactor 6 through the conduit 13 the brine in which all the sulphides have been oxidized into thiosulphates. This oxidized brine leaves the reactor through the conduit 13 at a pressure of 35 bars and a temperature of 95° C. If desired, it may be brought to atmospheric pressure by means of the pressure reducing valve 14 and then conducted to the heat exchanger 2 through the conduit 15 which it leaves at 16 at a temperature of 70° C. Thus, when it passes through the exchanger 2, it heats the brine to be treated which enters the exchanger through the conduit 1.

It is found that the rate of oxidation of the sulphides of the brine is higher than 95% and that the rate of utilization of the oxygen is equal to at least 90%.

EXAMPLE 2

It is desired to oxidize the sodium sulphide contained in black liquors at a concentration of 3.75 g/l. The rate of flow of the solution to be treated is 210 m$^3$ per hour. This black liquor is sent to the inlet of the tubular reactor 6 at a temperature of 95° C. and at an absolute pressure of 2.5 bars. Gaseous oxygen is sent to the inlet of the reactor in parallel with the solution 6 at a rate of flow of 420 kg/h and at a pressure slightly higher than an absolute pressure of 2.5 bars.

Bearing in mind the rate of flow of the solution to be treated (210 m$^3$ per hour), a reactor 6 is used whose diameter is 0.2 m and whose length is 100 m. The surface velocity in an empty pipe of the solution is 1.856 m/s and that of the oxygen is 1.4 m/s.

There is recovered at the outlet of the reactor 6, through the conduit 13, a black liquor in which all the sodium sulphide is oxidized into thiosulphate and whose temperature is 99° C.

The overall rate of oxidation of the sodium sulphide is 98% and the rate of utilization of the oxygen is 99%. The specific consumption is 0.79 KW/m$^3$.

The process according to the invention is applicable to the oxidation of mineral or organic products which are dissolved or in suspension in an aqueous solution, such as the treatment of effluents for the chemical destruction of pollutants (sulphides, thiosulphates, sulphites, phenols, cyanides, pesticides, etc. . . .), the treatment of work fluids recycled in a factory (regeneration of sodium waters of petrol refineries, reoxygenation of papermaking white waters, etc. . . .), the oxidizing lixiviation of ores.

In the process according to the invention, the gaseous oxygen is introduced at a pressure slightly higher than that of the liquid to be treated. "Slightly" generally means that the pressure of the gaseous oxygen must be high enough to enable it to penetrate the liquid.

What is claimed is:

1. Process for oxidizing substances which are dissolved or in suspension in an aqueous solution, said process comprising injecting into an inlet of a hollow, polyphase tubular reactor, said reactor having a single oxygen inlet connected to a jet located internally of said reactor, said solution at such temperature that the oxidation reaction occurs at a temperature higher than 50° C. and at an absolute pressure higher than 2 bars, injecting gaseous oxygen into said oxygen inlet as a single injection at a pressure slightly higher than said liquid pressure, and collecting the solution in which said substances are oxidized at an outlet of said tubular reactor, said injection of the solution and the gaseous oxygen being effected in the same direction at a pressure which is not more than about 210 bars and a temperature which is not more than about 370° C., the velocity in an empty pipe of between 1 m/s and 10 m/s and the injection of the oxygen being carried out at a surface velocity in an empty pipe of between 0.0m/s and 5 m/s, the specific energy due to pressure drops consumed in the reactor per unit volume of the reactor being between 0.4 KW/m$^3$ and 40 KW/m$^3$, the rate of oxidation of the substances being at least 90% while the rate of utilization of the oxygen in the course of the oxidation reaction is at least 90%.

2. Process according to claim 1, which further comprises compressing liquid oxygen to a pressure slightly higher than the pressure of the injected solution, and then vaporizing the oxygen by maintaining it at said pressure before injecting it into the reactor.

3. Process according to claim 2, comprising preheating the solution to be oxidized before it enters the reactor by means of the oxidized solution recovered at the outlet of the reactor.

4. Process according to claim 1, comprising preheating the solution to be oxidized before it enters the reactor by means of the oxidized solution recovered at the outlet of the reactor.

5. Process according to claim 1, wherein the substances which are oxidized are selected from the group consisting of sulphides, thiosulphates, sulphites, phenols, cyanides and pesticiles.

6. Process for oxidizing a sulphite or polysulphide which is dissolved or in suspension in an aqueous solution, said process comprising injecting into an inlet of a hollow, polyphase tubular reactor, said reactor having a single oxygen inlet connected to a jet located internally of said reactor, said solution at such temperature that the oxidation reaction occurs at a temperature higher than 50° C. and at an absolute pressure higher than 2 bars, injecting gaseous oxygen into said oxygen inlet as a single injection at a pressure slightly higher than said liquid pressure, and collecting the solution in which said substances are oxidized at an outlet of said tubular reactor, said injection of the solution and the gaseous oxygen being effected in the same direction at a pressure which is not more than about 210 bars and a temperature which is not more than about 370° C., the injection of the solution being carried out at a surface velocity in an empty pipe of between 1 m/s and 10 m/s and the injection of the oxygen being carried out at a surface velocity in an empty pipe of between 0.01 m/s and 5 m/s, the specific energy due to pressure drops consumed in the reactor per unit volume of the reactor being between 0.4 KW/m$^3$ and 40 KW/m$^3$, the rate of oxidation of the substances being at least 90% while the rate of utilization of the oxygen in the course of the oxidation reaction is at least 90%.

* * * * *